US012603841B2

(12) United States Patent
Moreno et al.

(10) Patent No.: US 12,603,841 B2
(45) Date of Patent: Apr. 14, 2026

(54) GROUPING ENDPOINTS OF A NETWORK FOR NAT TO ORGANIZE IP ADDRESS SPACE FOR POLICY APPLICATIONS

(71) Applicant: Cisco Technology, Inc., San Jose, CA (US)

(72) Inventors: Victor Manuel Moreno, Carlsbad, CA (US); Shyamsundar N. Maniyar, San Jose, CA (US); Sanjay Kumar Hooda, Pleasanton, CA (US); Prakash C. Jain, Fremont, CA (US); Vinay Saini, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 17/665,868

(22) Filed: Feb. 7, 2022

(65) Prior Publication Data

US 2023/0254250 A1 Aug. 10, 2023

(51) Int. Cl.
*H04L 45/745* (2022.01)

(52) U.S. Cl.
CPC .................................. *H04L 45/745* (2013.01)

(58) Field of Classification Search
CPC ..................................................... H04L 45/745
See application file for complete search history.

(56) References Cited

U.S. PATENT DOCUMENTS

| | | | |
|---|---|---|---|
| 7,107,614 B1 | 9/2006 | Boden et al. | |
| 8,194,674 B1 | 6/2012 | Pagel et al. | |
| 2010/0251335 A1* | 9/2010 | Srisuresh | ................ H04L 12/66 726/13 |
| 2016/0212098 A1* | 7/2016 | Roch | ..................... H04L 63/029 |
| 2020/0389426 A1 | 12/2020 | Enguehard et al. | |
| 2021/0144075 A1 | 5/2021 | Indiresan et al. | |

* cited by examiner

*Primary Examiner* — Rhonda L Murphy
(74) *Attorney, Agent, or Firm* — Lee & Hayes, P.C.

(57) ABSTRACT

Techniques and architecture are described that utilize network address translation (NAT) based on a group tag such that legacy and third-party devices may utilize and apply "subnet" based policies, thereby allowing the subnet based policies to be as effective as "group" based policies. In particular, a subnet may be applied to a group tag where the group tag is not understandable outside an access network such as, for example, a fabric network. Thus, when a packet originates from a fabric network utilizing group tags representing source groups of endpoints and is destined for a legacy or a third-party device-based network that does not utilize and/or understand group tags, then the group is converted into a subnet. Since that subnet is different from the source host within the fabric network, network address translation (NAT) is utilized.

20 Claims, 4 Drawing Sheets

300

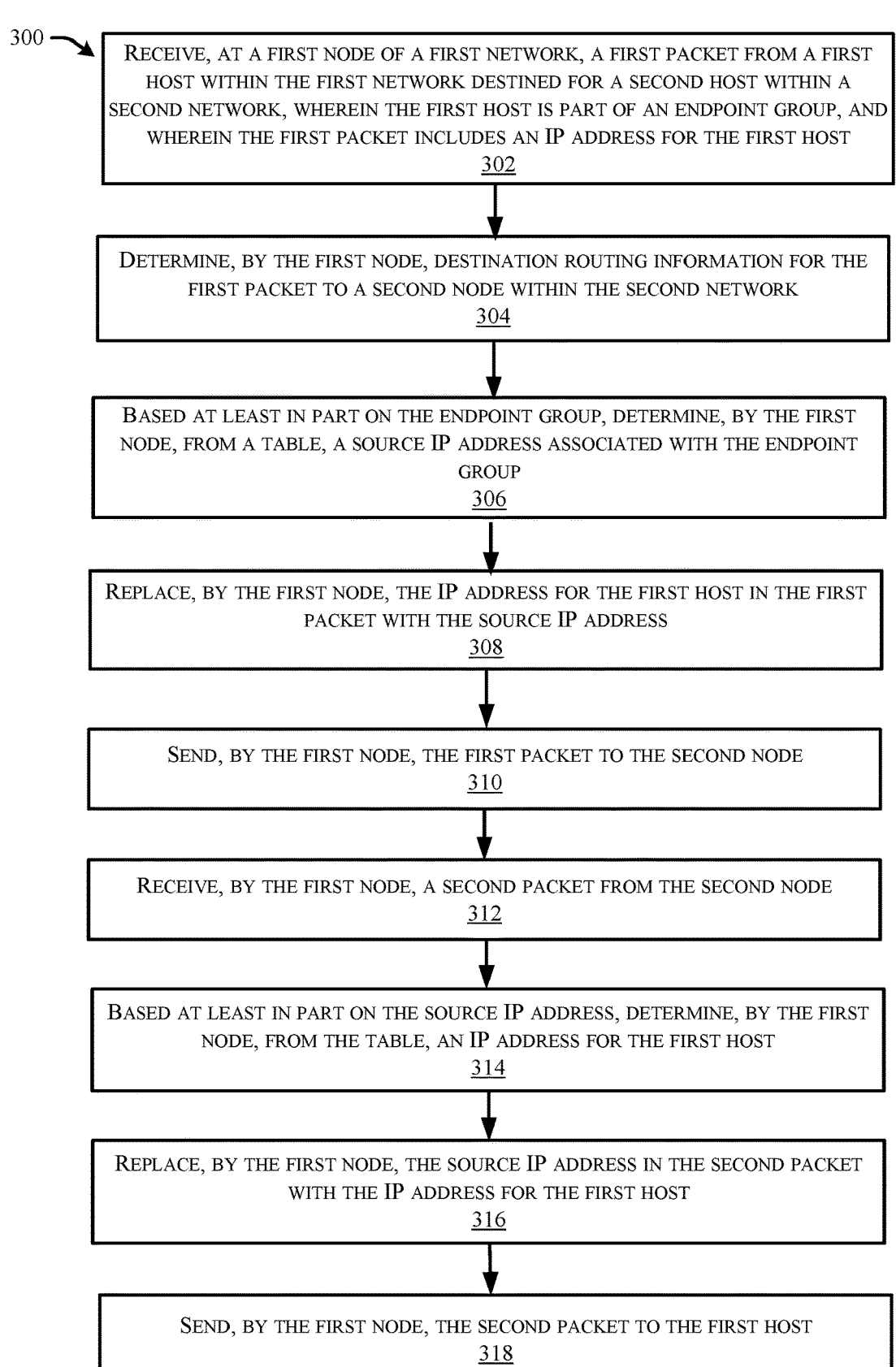

RECEIVE, AT A FIRST NODE OF A FIRST NETWORK, A FIRST PACKET FROM A FIRST
HOST WITHIN THE FIRST NETWORK DESTINED FOR A SECOND HOST WITHIN A
SECOND NETWORK, WHEREIN THE FIRST HOST IS PART OF AN ENDPOINT GROUP, AND
WHEREIN THE FIRST PACKET INCLUDES AN IP ADDRESS FOR THE FIRST HOST
302

DETERMINE, BY THE FIRST NODE, DESTINATION ROUTING INFORMATION FOR THE
FIRST PACKET TO A SECOND NODE WITHIN THE SECOND NETWORK
304

BASED AT LEAST IN PART ON THE ENDPOINT GROUP, DETERMINE, BY THE FIRST
NODE, FROM A TABLE, A SOURCE IP ADDRESS ASSOCIATED WITH THE ENDPOINT
GROUP
306

REPLACE, BY THE FIRST NODE, THE IP ADDRESS FOR THE FIRST HOST IN THE FIRST
PACKET WITH THE SOURCE IP ADDRESS
308

SEND, BY THE FIRST NODE, THE FIRST PACKET TO THE SECOND NODE
310

RECEIVE, BY THE FIRST NODE, A SECOND PACKET FROM THE SECOND NODE
312

BASED AT LEAST IN PART ON THE SOURCE IP ADDRESS, DETERMINE, BY THE FIRST
NODE, FROM THE TABLE, AN IP ADDRESS FOR THE FIRST HOST
314

REPLACE, BY THE FIRST NODE, THE SOURCE IP ADDRESS IN THE SECOND PACKET
WITH THE IP ADDRESS FOR THE FIRST HOST
316

SEND, BY THE FIRST NODE, THE SECOND PACKET TO THE FIRST HOST
318

FIG. 3

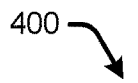
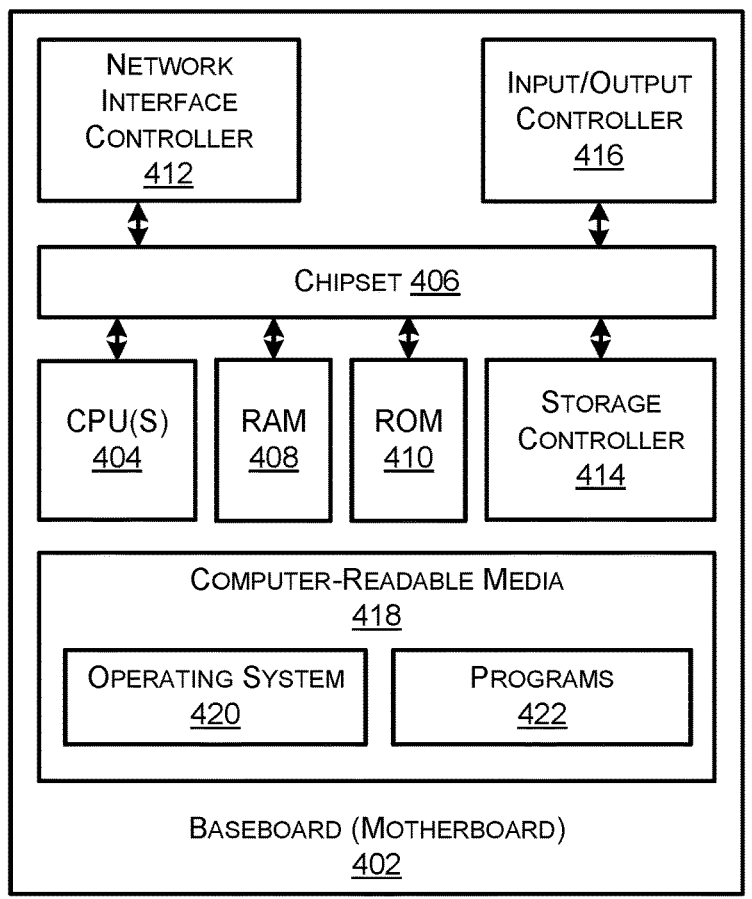
FIG. 4

GROUPING ENDPOINTS OF A NETWORK FOR NAT TO ORGANIZE IP ADDRESS SPACE FOR POLICY APPLICATIONS

TECHNICAL FIELD

The present disclosure relates generally to grouping endpoints of networks and providing a source Internet protocol (IP) address to an endpoint based on an endpoint group to which the endpoint belongs, and in particular to providing a source IP address to the endpoint based on the endpoint group to which the endpoint belongs using network address translation (NAT).

BACKGROUND

Enterprise access networks such as, for example, enterprise fabric networks, software defined (SD) access (SD-access) networks, SD networks, overlay networks, etc., (referred to herein as enterprise fabric networks or fabric networks) help in scaling of endpoints in current enterprise networks with an increasing number of wireless devices, e.g., mobile devices, Internet-of-Things devices (IoT), etc., as well as virtual endpoints (virtual machines (VMs)) within devices. In addition to connectivity, the enterprise fabric networks also provide on-demand monitoring and services, e.g., assurance, serviceability, security, etc., for all endpoints in the enterprise fabric network.

Traditional network architecture suffers from inefficient application of policies, e.g., security policies. Thus, group tags (source group tags/destination group tag) have been developed to use in applying policies within networks. An example of a group tag includes a security group tag (SGT) that indicates security policies for packets based on a source of the packets and/or a destination for the packets. This works well if all of the network devices of the network are using group-based policies and are able to carry the SGT/group tag across the network. SD-access networks carry the group tags in a simplified/topology independent manner that allows the easy implementation of group-based policies. However, legacy and certain third-party network devices in a network are not able to handle group-based policies in a very extensive manner. Such legacy and third-party network devices generally apply policies based on IP addresses, e.g., source IP addresses.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for utilizing network address translation (NAT) based on a group tag such that legacy and third-party devices may utilize and apply "subnet" based policies, thereby allowing the subnet based policies to be as effective as "group" based policies.

FIG. 4 is a computer architecture diagram showing an example computer hardware architecture for implementing a device that can be utilized to implement aspects of the various technologies presented herein.

DESCRIPTION OF EXAMPLE EMBODIMENTS

Overview

Figure 1:
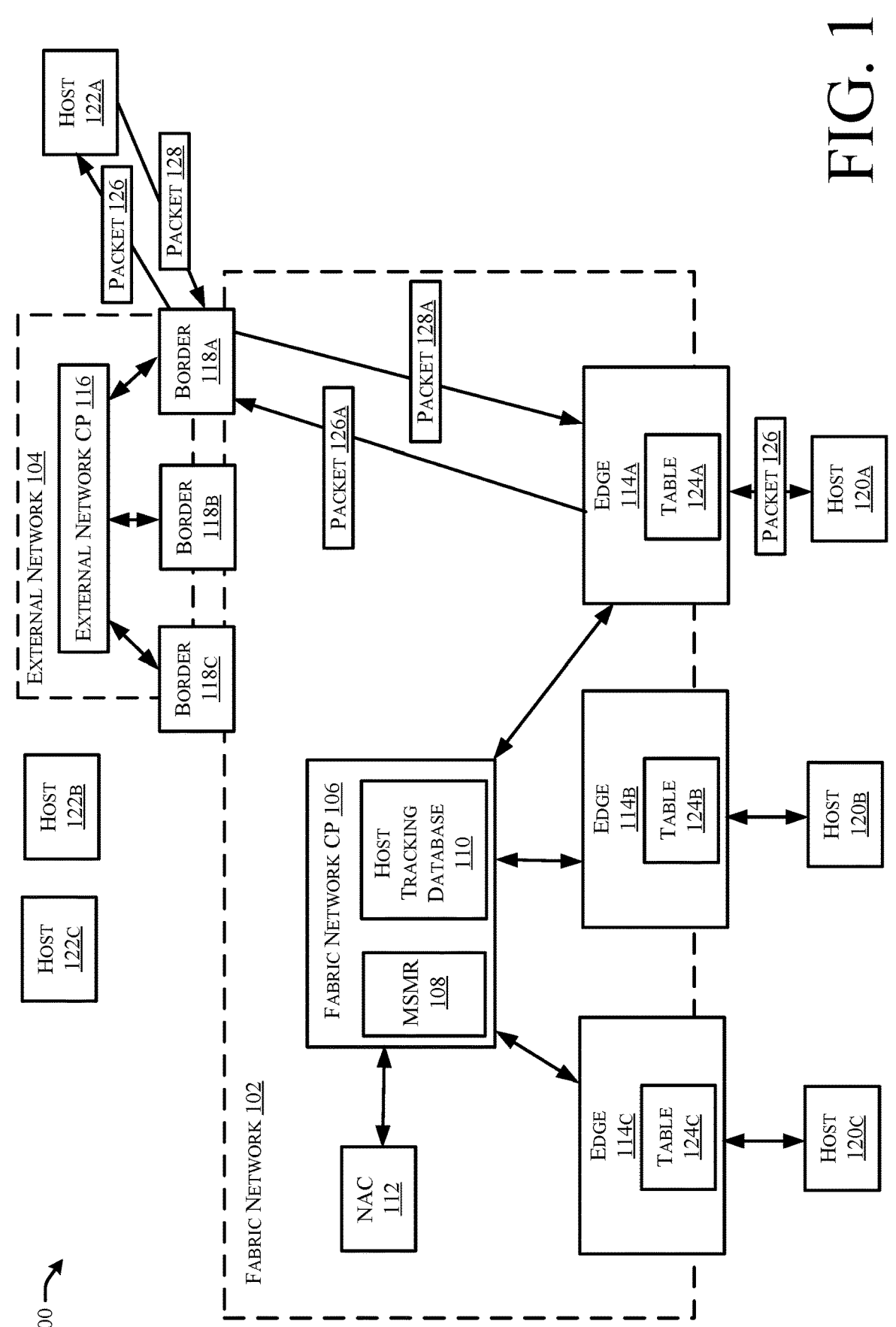
FIG. 1 schematically illustrates an example network arrangement of an enterprise access network in the form of a fabric network and an external access network.

The present disclosure describes techniques and architecture that utilize network address translation (NAT) based on a group tag such that legacy and third-party devices may utilize and apply "subnet" based policies, thereby allowing the subnet based policies to be as effective as "group" based policies.

In particular, a subnet may be applied to a group tag where the group tag is not understandable outside an access network such as, for example, a fabric network. Thus, when a packet originates from a fabric network utilizing group tags representing source groups of endpoints and is destined for a legacy or a third-party device-based network that does not utilize and/or understand group tags, then the group is converted into a subnet. Since that subnet is different from the source host within the fabric network, network address translation (NAT) is utilized.

The fabric network generally includes a control plane, one or more fabric edges, and one or more borders. Thus, the NAT, based on a source group of endpoints, may be performed in a distributed manner. In non-fabric environments, the NAT may be performed at particular locations in the network. When a host appears, e.g., registers, on a fabric edge, the fabric control plane, e.g., the map server/map resolver (MSMR) of the control plane, checks the security group tag. Since the host is part of a first source group, e.g., has a group tag of, for example, 100, the MSMR determines, from a host tracking database in the control plane, that the routing locator (RLOC) provides that packets from the host should be, for example, routed to a first fabric edge. The source grouping of endpoints, e.g., hosts, may be based on one or more of a security group tag, verified security posture, a flow identification (ID), user credentials, a device type, other non-security related attributes, etc.

Additionally, since the host is part of a first source group, e.g., has the group tag of, for example, 100, the MSMR assigns an external source Internet protocol (IP) address for packets originating from the host. Generally, the source IP address comes from a range of IP addresses assigned to the source group, e.g., based on the group tag, to thereby create a subnet related to the source group. In configurations, the range of IP addresses comprises a sequential range of IP addresses. Often the first address is saved for a gateway of the fabric network. Thus, a next available address within the group addresses may be assigned as the external source IP address for the host. Alternatively, the external source IP address may be randomly selected from the group of addresses. The selected external source IP address for the host may be stored in the host tracking database on the MSMR and correlated with the host's internal address within the fabric network in the host tracking database. In configurations, the selected external source IP address for the host may be stored, additionally or alternatively, in a table on the first fabric edge and correlated with the host's internal address within the fabric network in the table.

A packet originating from the host and destined for a destination host may have the host's internal address replaced with the selected external source IP address based on NAT using the host's internal address. The packet may then be encapsulated by the first fabric edge to virtual extensible local access network (VxLAN) to the appropriate border. The first fabric edge may then send the encapsulated packet to the destination, e.g., the appropriate border, based on the RLOC. The border may then decapsulate the packet and forward the packet on to the destination host.

A reply, e.g., reply packet, from the destination host may then be forwarded to the border. The border may inquire about the RLOC based on the external source IP address from the MSMR. The MSMR, based on the external source IP address, may then provide the RLOC to the border indicating that the reply packet should be routed to the first fabric edge. The border may then forward the reply packet to the first fabric edge. Based on the external source IP address, the first fabric edge may perform another NAT operation. Based on the table within the first fabric edge (or the host tracking database), the first fabric edge determines the appropriate source host that sent the original packet and will forward the reply packet to this source host using the source host's internal address within the fabric network, e.g., the first fabric edge replaces the external source IP address in the packet with the source's host address.

Currently, devices performing NAT have an example configuration of:

Device(config) #ip nat pool NAT-pool 192.168.202.1
        192.168.202.254 netmask 255.255.255.0
    Device(config) #access-list 1 permit 192.168.201.30
        0.0.0.255
    Device(config) #ip nat inside source list 1 pool NAT-pool With the inventive techniques described herein, an example of a new configuration for devices performing NAT is:

Device(config) #ip nat pool NAT-pool 192.168.202.1
        192.168.202.254 netmask 255.255.255.0
    Device(config) #ip nat inside source group 100 pool
        NAT-pool In the new example configuration, the introduction of the term "group" is the primary change since instead of matching on the source IP address, NAT is working on the source group tag. The source group tag 100 may have an IP address from a multitude of subnet(s). For example, a group 100 list of IP addresses to start with may be {192.168.201.2/32, 10.1.2.1/32, 10.1.3.1/32, 10.1.4.0/25 . . . }. Additionally, this list of addresses may keep changing and an administrator does not need to change any NAT configuration. Since this is totally dynamic, at different times the same IP address may have a different source group tag.

As an example, a method may include receiving, at a first node of a first network, a first packet from a first host within the first network destined for a second host within a second network, wherein the first host is part of an endpoint group, and wherein the first packet includes an Internet protocol (IP) address for the first host. The method may also include determining, by the first node, destination routing information for the first packet to a second node within the second network. The method may further include based at least in part on the endpoint group, determining, by the first node from a table, a source Internet protocol (IP) address associated with the endpoint group. The method may also include replacing, by the first node, the IP address for the first host in the first packet with the source IP address. The method may additionally include sending, by the first node, the first packet to the second node.

In configurations, the method may further include receiving, by the first node, a second packet from the second node, wherein the second node includes the source IP address. Such a method may also include based at least in part on the source IP address, determining, by the first node from the table, an IP address for the first host. Such a method may further include replacing, by the first node, the source IP address in the first packet with the IP address for the first host. Such a method may additionally include sending, by the first node, the second packet to the first host.

In configurations, the endpoint group is based at least in part on a security group tag. In some configurations, the endpoint group is based at least in part on one or more of a security group tag, verified security posture, a flow identification (ID), user credentials, a device type, other non-security related attributes, etc.

In configurations, the method may further include registering, by the first node, the first host with a control plane of the first network. Such a method may also include based at least in part on the endpoint group of the first host, assigning, by the control plane, the source IP address to the first host. Such a method may additionally include forwarding the source IP address to the first node. Such a method may also include storing, by the first node, the source IP address with the IP address for the first host.

In configurations, the source IP address is one of a plurality of source IP addresses. In some configurations, the plurality of source IP addresses comprises a sequential range of source IP addresses. In some configurations, the source IP address is selected based at least in part on a next available source IP address within the range of source IP addresses. In some configurations, the source IP address is selected randomly from available source IP addresses within the range of source IP addresses.

The techniques described herein may be performed by a system and/or device having non-transitory computer-readable media storing computer-executable instructions that, when executed by one or more processors, performs the method described above.

EXAMPLE EMBODIMENTS

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example network arrangement 100 of an enterprise access network in the form of a fabric network 102 (also referred to herein as fabric 102), as well as an external access network 104, e.g., a cloud network, data center, software defined wide access network (SDWAN), etc. The external access network 104 may also be in the form of an extended access network that is in the form of a wireless extended access network or in the form of a wired extended access network, e.g., a layer two (L2) network. The external access network 104 may also be in the form of an internet-of-things (IoT) extended access network.

The fabric network 102 incudes a controller and/or a control plane 106 that includes a map server/map resolver (MSMR) 108. The control plane 106 also includes a host tracking database 110. In configurations, the fabric network 102 may also include a network architecture controller (NAC) 112, e.g., Cisco® digital network architecture controller (DNAC). The fabric network 102 also includes multiple edges 114. In the example network arrangement 100, three edges 114a, 114b, and 114c are illustrated, although, as is known, there may be fewer or more edges 114.

The external access network 104 includes a controller and/or a control plane 116 (referred to herein as controller/control plane 116) and multiple borders 118. In the example network arrangement 100, two borders 118a and 118b are illustrated, although, as is known, there may be fewer or more borders 118.

Endpoints, e.g., hosts 120, are included in the example network arrangement 100. The hosts 120 are "behind" the edges 114 and use the fabric network 102 to communicate and/or interact with hosts 122 via the external access network 104. In the example network arrangement 100, there are three hosts 120a, 120b, 120c and three hosts 122a, 122b, 122c illustrated, although, as is known, there may be fewer or more hosts 120 and/or 122.

In the example network arrangement 100, the fabric network 102 is configured to utilize and/or recognize group tags, e.g., security group tags (SGTs). Thus, hosts 120 may be grouped into endpoint groups based on SGTs. In configurations, the hosts 120 may be grouped into endpoint groups based on one or more of a security group tag, verified security posture, a flow identification (ID), user credentials, a device type, other non-security related attributes, etc. In the example network arrangement 100, the external access network 104 does not utilize and/or recognize SGTs. In configurations, the external access network 104 may not utilize and/or recognize endpoint groups, e.g., group tags, based on one or more of a security group tag, verified security posture, a flow identification (ID), user credentials, a device type, other non-security related attributes, etc.

In an example, host 120a wishes to communicate and/or interact with host 122a. Host 120a is part of a source group of endpoints having a SGT 1000, e.g., packets originating from host 120a include a SGT 1000. As previously noted, the external access network 104 does not utilize and/or recognize SGTs. Thus, not all of the network devices of the external access network 104 are using group-based policies and are able to carry the SGTs/group tags across the external access network 104. In the present example, host 120a is behind edge 114a and host 122a is behind border 118a.

When the host 120a first appears, e.g., registers, on the edge 114a, the control plane 106, e.g., the map server/map resolver (MSMR) 108 of the control plane 106, checks the SGT of host 120a. Since the host 120a is part of the security group 1000, e.g., has a SGT of 1000, the MSMR 108 determines, from the host tracking database 110 in the control plane 106, that the routing locator (RLOC) indicates that packets from the host 120a should be routed to edge 114a.

Additionally, since the host is part of a source group, e.g., has the SGT of 1000, the MSMR 108 assigns an external source Internet protocol (IP) address for packets originating from the host 120a. Generally, the external source IP address comes from a range of IP addresses assigned to the source group based on the grouping of endpoints, e.g., a group tag, which in the present example is SGT 1000. The range of IP addresses represents a subnet related to the source group, e.g., SGT 1000. In configurations, the range of IP addresses comprises a sequential range of IP addresses. Often the first address is saved for a gateway (not illustrated) of the fabric network 102. Thus, a next available address within the group of IP addresses may be assigned as the external source IP address for the host 120a. Alternatively, the external source IP address may be randomly selected from the group of IP addresses. The selected external source IP address for the host 120a may be stored in the host tracking database 110, which, in configurations may be on the MSMR 108. The selected external source IP address may be correlated with the host's internal address within the fabric network 102 in the host tracking database 110. In configurations, the selected external source IP address for the host 120a may be stored, additionally or alternatively, in a table 124 on the edge 114a and correlated with the host's internal address within the fabric network 102 in the table 124.

For the present example, the host 120a may be part of security group 1000, thereby having a SGT of 1000, and may have an internal address of 10.1.1.2; the host 120b may be part of security group 2000, thereby having a SGT of 2000, and may have an internal address of 10.1.1.4; and the host 120c may be part of security group 3000, thereby having a SGT of 3000, and may have an internal address of 10.1.1.6. An example range of potential external source IP addresses for SGT 1000 may be 20.1.1.0/24. An example range of potential external source IP addresses for SGT 2000 may be 30.1.1.0/24. An example range of potential external source IP addresses for SGT 3000 may be 40.1.1.0/16.

The control plane 106 needs to be configured with the external source IP addresses corresponding to the groups for the NAT. For the present example, the following configuration achieves this for the control plane 106:

Service nat group 1000 nat 20.1.1.0/24 group 2000 nat 30.1.1.0/24 group 3000 nat 40.1.0.0/16

When the host 120a appears on, e.g., registers with, edge 114a, the edge 114a may receive an IP: SGT of 10.1.1.2: SGT1000 from the host 120a. The edge 114a registers host 120a's information (IP: SGT of 10.1.1.2: SGT1000) with the control plane 106. As a result of the registration, the control plane 106 is aware of the new host 120a. Since the control plane 106 is aware from the registration that the host 120a's group is SGT 1000, and from the configuration for the control plane 106 the control plane 106 knows that the NAT address for group 1000 is 20.1.1.0/24, the control plane 106 may allocate the next NAT address for the external source IP address for the host 120a. In the present example, the control plane 106 may allocate the external source IP address as 20.1.1.2 and store the external source IP address of 20.1.1.2 in the host tracking database 110 with the RLOC for the host 120a. As previously noted, the external source IP address may be randomly selected from the group of IP addresses.

The control plane 106 sends the external source IP address of 20.1.1.2 to the edge 114a. The edge 114a on receiving this information from the control plane 106 stores the information in its table 124a so that the edge 114a may do source NAT in the outgoing direction of packets from host 120a to hosts 122 and destination NAT in the incoming direction of packets (e.g., reply packets) from hosts 122 to host 120a. For example, the edge 114a may store the external source IP address of 20.1.1.2 in the table 124a correlated with the internal address of 10.1.1.2 for host 120a. Additionally, or alternatively, additional identifiers for host 120a may be correlated with external source IP address of 20.1.1.2 and stored in the table 124a. Some or all of the information may also, or alternatively, be stored in the host tracking database 110.

For the present example, when a packet 126 originating from the host 120a and destined for the host 122a is received by the edge 114a, the edge 114a obtains the RLOC for host 122a from the control plane 106, e.g., the MSMR 108, and determines that the packet 126 should be forwarded to border 118a. The edge 114a may perform NAT using the host 120*a*'s internal address of 10.1.1.2 to obtain the external source IP address of 20.1.1.2. Based on the NAT, the packet 126 may have the host 120*a*'s internal address of 10.1.1.2 replaced with the external source IP address of 20.1.1.2. The packet 126 may then be encapsulated to, for example, virtual extensible local access network (VxLAN) to, e.g., border 118*a*, by the edge 114*a* resulting in encapsulated packet 126*a*. The edge 114*a* may send the encapsulated packet 126*a* to the appropriate destination, e.g., the border 118*a*, based on the RLOC from the MSMR 108. The border 118*a* may then decapsulate the packet 126*a*, resulting in packet 126, and forward the packet 126 on to the destination host 122*a*.

A reply from the host 122*a* destined for the host 120*a*, e.g., reply packet 128 that includes external source IP address 20.1.1.2, may then be forwarded to the border 118*a*. The border 118*a* may inquire about the RLOC for the host 120*a* based on the external source IP address 20.1.1.2 from the MSMR 108. The MSMR 108, based on the external source IP address 20.1.1.2, may then provide the RLOC to the border 118*a* indicating that the reply packet 128 should be routed to the edge 114*a*. The border 118*a* may encapsulate the packet 128 to, for example, virtual extensible local access network (VxLAN) to, e.g., edge 114*a*, resulting in encapsulated packet 128*a* and forward the reply packet to the edge 114*a*, which may then decapsulate the reply packet 128*a*. Based on the external source IP address of 20.1.1.2, the edge 114*a* may perform another NAT operation. Based on the table 124*a* within the edge 114*a* (or the host tracking database 110 in the control plane 106), the edge 114*a* determines the appropriate host that sent the original packet 126, e.g., host 120*a* having an internal address 10.1.1.2, and replaces the external source IP address of 20.1.1.2 of the reply packet 128 with the internal address of 10.1.1.2. Based on the NAT, the edge 114*a* may then forward the reply packet 128 to the host 120*a* using the host 120*a*'s internal address 10.1.1.2 within the fabric network 102.

As previously noted, the fabric network 102 generally includes the control plane 106, one or more fabric edges 114*a*, and one or more borders 118, as well as other network devices that are not illustrated or described heren. Thus, the NAT described herein, based on a source group of endpoints, may be performed in a distributed manner. In non-fabric environments, the NAT described herein may be performed at particular locations in the network. As previously noted, the source grouping of endpoints, e.g., hosts 114, may be based on one or more of a security group tag, verified security posture, a flow identification (ID), user credentials, a device type, other non-security related attributes, etc.

Figure 2:
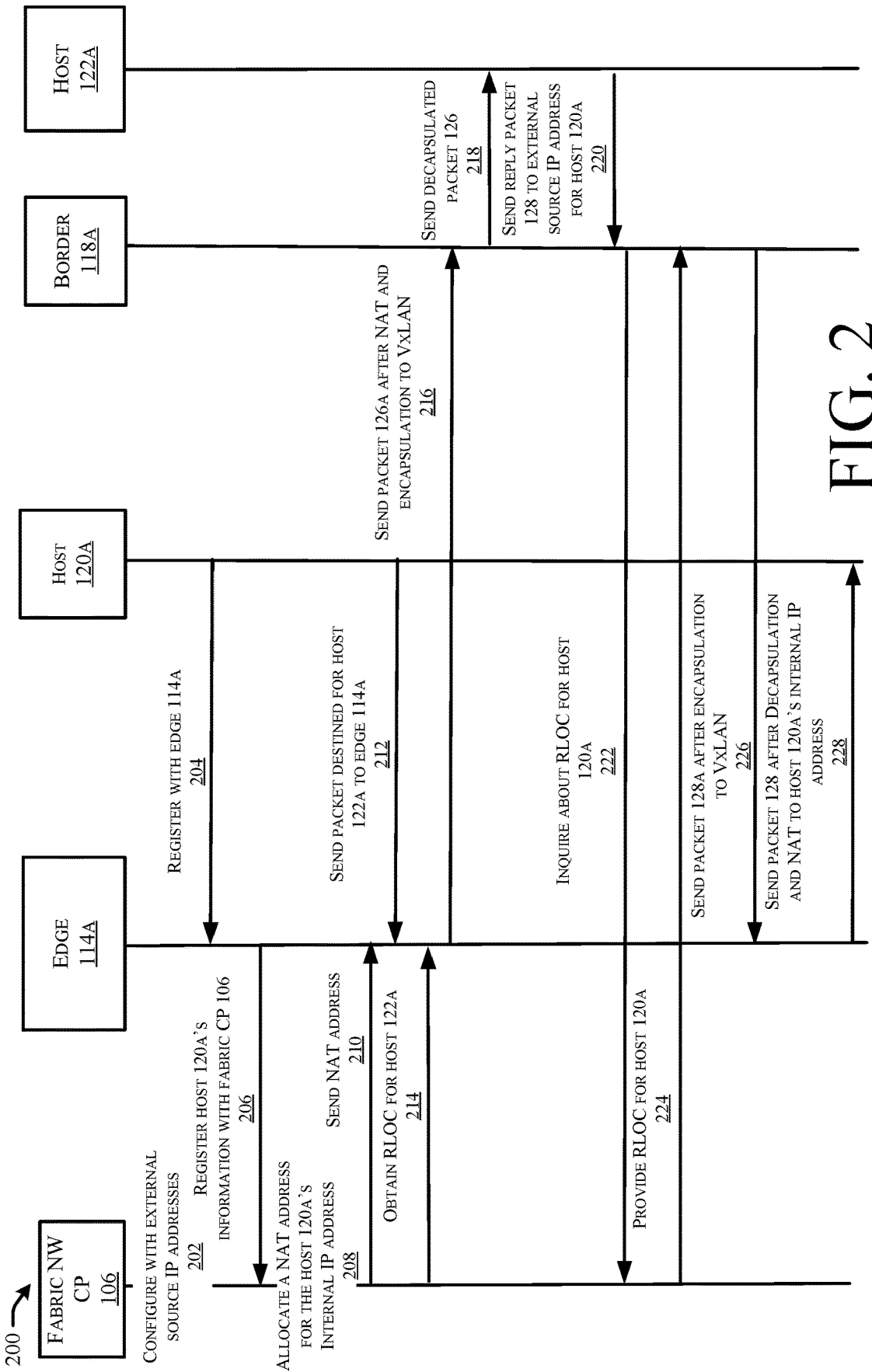
FIG. 2 illustrates an example flow for utilizing network address translation (NAT) based on a group tag such that legacy and third-party devices may utilize and apply "subnet" based policies, thereby allowing the subnet based policies to be as effective as "group" based policies.

FIG. 2 illustrates an example flow 200 for utilizing network address translation (NAT) based on a group tag such that legacy and third-party devices may utilize and apply "subnet" based policies, thereby allowing the subnet based policies to be as effective as "group" based policies. In particular, a subnet may be applied to a group tag representing source groups of endpoints where the group tag is not understandable outside an access network such as, for example, fabric network 102. Thus, when a packet originates from the access network 102 utilizing group tags and is destined for a legacy or a third-party device-based network, for example, external access network 104, that does not utilize and/or understand group tags, then the group may be converted into a subnet. Since that subnet is different from the source host within the fabric network, network address translation (NAT) may be utilized.

At 202, control plane 106 is configured with external source IP addresses corresponding to the source groups or group tags for the NAT. As an example, the following configuration achieves this for the control plane 106.

Service nat
group 1000 nat 20.1.1.0/24
group 2000 nat 30.1.1.0/24
group 3000 nat 40.1.0.0/16

At 204, host 120*a* appears on, e.g., registers with, edge 114*a*. The edge 114*a* may receive an IP: SGT of 10.1.1.2: SGT1000 from the host 120*a*. At 206, the edge 114*a* registers host 120*a*'s information (IP: SGT of 10.1.1.2: SGT1000) with the control plane 106.

At 208, the control plane 106 allocates a NAT address (e.g., an external source IP address) for the host 120*a*'s internal IP address. Since the control plane 106 is aware from the registration that the host 120*a*'s group is SGT 1000, and from the configuration for the control plane 106, the control plane 106 knows that the NAT address for group 1000 is 20.1.1.0/24, the control plane 106 may allocate the next NAT address as the external source IP address for the host 120*a*. In the present example, the control plane 106 may allocate the external source IP address as 20.1.1.2 and store the external source IP address of 20.1.1.2 in the host tracking database 110 with the RLOC for the host 120*a*.

At 210, the control plane 106 sends the NAT address (e.g., the external source IP address of 20.1.1.2) to the edge 114*a*. The edge 114*a* on receiving this information from the control plane 106 stores the information in its table 124*a* so that the edge 114*a* may do source NAT in the outgoing direction of packets from host 120*a* to hosts 122 and destination NAT in the incoming direction of packets (e.g., reply packets) from hosts 122 to host 120*a*.

At 212, the host 120*a* sends a packet 126 to the edge 114*a* that is destined for the host 122*a*. At 214, the edge 114*a* obtains the RLOC for host 122*a* from the control plane 106, e.g., the MSMR 108, and determines that the packet 126 should be forwarded to border 118*a*. The edge 114*a* may then perform NAT using the host 120*a*'s internal address of 10.1.1.2 to obtain the external source IP address of 20.1.1.2. Based on the NAT, the packet 126 may have the host 120*a*'s internal address of 10.1.1.2 replaced with the external source IP address of 20.1.1.2. The packet 126 may then be encapsulated to, for example, virtual extensible local access network (VxLAN) to, e.g., border 118*a*, by the edge 114*a* resulting in encapsulated packet 126*a*. At 216, the edge 114*a* may send the encapsulated packet 126*a* to the border 118*a* based on the RLOC from the MSMR 108. At 218, the border 118*a* may then decapsulate the packet 126*a*, resulting in packet 126, and forward the packet 126 on to the destination host 122*a*.

At 220, the host 22*a* sends a reply to the border 118*a* destined for the host 120*a*, e.g., reply packet 128 to external source IP address 20.1.1.2. At 222, the border 118*a* may inquire about the RLOC for the host 120*a* based on the external source IP address 20.1.1.2 from the fabric control plane 106, e.g., the MSMR 108. At 224, the MSMR 108, based on the external source IP address 20.1.1.2, may then provide the RLOC to the border 118*a* indicating that the reply packet 128 should be routed to the edge 114*a*. The border 118*a* may encapsulate the packet 128 to, for example, virtual extensible local access network (VxLAN) to, e.g., edge 114*a*, resulting in encapsulated reply packet 128*a* and at 226 forward the encapsulated reply packet 128*a* to the edge 114*a*, which may then decapsulate the reply packet 128*a*. Based on the external source IP address of 20.1.1.2, the edge 114*a* may perform another NAT operation. Based on the table 124*a* within the edge 114*a* (or the host tracking database 110 in the control plane 106), the edge 114*a* determines the appropriate host that sent the original packet 126, e.g., host 120a having an internal address 10.1.1.2, and replaces the external source IP address of 20.1.1.2 of the reply packet 128 with the internal address of 10.1.1.2. At 228, the edge 114a may forward the reply packet 128 to the host 120a using the host 120a's internal address 10.1.1.2 within the fabric network 102.

FIG. 3 illustrates a flow diagram of an example method 300 and illustrates aspects of the functions performed at least partly by network devices of a network as described with respect to FIGS. 1 and 2. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for utilizing network address translation (NAT) based on a group tag such that legacy and third-party devices may utilize and apply "subnet" based policies, thereby allowing the subnet based policies to be as effective as "group" based policies. In some examples, the method 300 may be performed by a system comprising one or more processors and one or more non-transitory computer-readable media storing computer-executable instructions that, when executed by the one or more processors, cause the one or more processors to perform the method 300.

At 302, a first node of a first network receives a first packet from a first host within the first network destined for a second host within a second network, wherein the first host is part of an endpoint group, and wherein the first packet includes an Internet protocol (IP) address for the first host. For example, edge 114a may receive a packet 126 from host 120a that is destined for host 122a, where the host 120a is part of, for example, a source group of endpoints having a SGT 1000, e.g., packets originating from host 120a include a SGT 1000. The packet 126 may include the internal IP address of 10.1.1.2 for the host 120a.

At 304, the first node determines destination routing information for the first packet to a second node within the second network. For example, the edge 114a may obtain the RLOC for host 122a from the MSMR 108 of the control plane 106, which indicates that the packets destined for host 122a should be routed to border 118a.

At 306, based at least in part on the endpoint group, the first node determines, from a table, a source IP address associated with the endpoint group. For example, the edge 114a may determine using NAT, from either table 124 or host tracking database 110, that the source IP address for packets from host 120a should be 20.1.1.2 based on the SGT 1000.

At 308, the first node replaces the IP address for the first host in the first packet with the source IP address. For example, the edge 114a may replace the internal IP address of 10.1.1.2 for the host 120a in the packet 126 with the external source IP address of 20.1.1.2 based on the NAT.

At 310, the first node sends the first packet to the second node. For example, the edge 114a may encapsulate the packet 126 to, for example, virtual extensible local access network (VxLAN) to e.g., border 118a, and send the encapsulated packet 126a to the border 118a, which may decapsulate the encapsulated packet 126a and forward the packet to the host 122a.

At 312, the first node receives a second packet from the second node, wherein the second node includes the source IP address. For example, the host 122a sends a packet, e.g., a reply packet 128 destined for host 120a that includes external source IP address 20.1.1.2. The border 118a may inquire about the RLOC for the host 120a based on the external source IP address 20.1.1.2 from the MSMR 108. The MSMR 108, based on the external source IP address 20.1.1.2, may then provide the RLOC to the border 118a indicating that the reply packet 128 should be routed to the edge 114a. The border 118a may encapsulate the packet 128 to, for example, virtual extensible local access network (VxLAN) to, e.g., edge 114a, resulting in encapsulated reply packet 128a and forward the encapsulated reply packet 128a to the edge 114a.

At 314, based at least in part on the source IP address, the first node determines, from the table, an IP address for the first host. For example, the edge 114a may decapsulate the encapsulated reply packet 128a to provide the reply packet 128. Based on the external source IP address of 20.1.1.2 in the reply packet 128, the edge 114a may perform another NAT operation. Based on the table 124a within the edge 114a (or the host tracking database 110 in the control plane 106), the edge 114a may determine the appropriate host that sent the original packet 126, e.g., host 120a having an internal IP address of 10.1.1.2.

At 316, the first node replaces the source IP address in the second packet with the IP address for the first host. For example, the edge 114a may replace the external source IP address of 20.1.1.2 in the reply packet 128 with the internal source IP address of 20.1.1.2 based on the NAT.

At 318, the first node sends the second packet to the first host. For example, the edge 114a may forward the reply packet 128 to the host 120a using the host 120a's internal address of 10.1.1.2 within the fabric network 102.

Thus, the present disclosure provides techniques and architecture for utilizing network address translation (NAT) based on a group tag such that legacy and third-party devices may utilize "subnet" based policies, thereby allowing the subnet based policies to be as effective as "group" based policies. In particular, a subnet may be applied to a group tag representing source groups of endpoints where the group tag is not understandable outside an access network such as, for example, a fabric network. Thus, when a packet originates from the access network 102 utilizing group tags and is destined for a legacy or a third-party device-based network, for example, an external access network such as external access network 104, that does not utilize and/or understand group tags, then the group may be converted into a subnet. Since that subnet is different from the source host within the fabric network, network address translation (NAT) may be utilized. The techniques and architecture described herein allow NAT to be applied based on group information, which allows the rest of the network to work for a) forwarding and b) policies to be based on the NAT address, thus allowing the original policies to be maintained. The techniques and architecture described herein achieve this dynamically, i.e an addition of new IP addresses and/or a new IP address pool for the endpoints (e.g., hosts) does not impact the rest of the network.

FIG. 4 shows an example computer architecture for a computing device 400 capable of executing program components for implementing the functionality described above. In configurations, one or more of the computing devices 400 may be used to implement one or more of the components of FIGS. 1-3. The computer architecture shown in FIG. 4 illustrates a conventional server computer, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the arrangement 100. The chipset 406 can include functionality for providing network connectivity through a NIC 412, such as a gigabit Ethernet adapter. In configurations, the NIC 412 a smart NIC (based on data processing units (DPUs)) that can be plugged into data center servers to provide networking capability. The NIC 412 is capable of connecting the computing device 400 to other computing devices over the networks of the arrangement 100. It should be appreciated that multiple NICs 412 can be present in the computing device 400, connecting the computer to other types of networks and remote computer systems.

The computing device 400 can be connected to a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1-3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

receiving, at a first node of a first network, a first packet from a first host within the first network destined for a second host within a second network, wherein the first host is part of an endpoint group, and wherein the first packet includes an Internet protocol (IP) address for the first host;

determining, by the first node, destination routing information for the first packet to a second node within the second network;

based at least in part on the endpoint group, determining, by the first node from a table, an external source IP address associated with the endpoint group, wherein the external source IP address is one of a plurality of external source IP addresses assigned to the endpoint group for replacing IP addresses within the endpoint group, and wherein the plurality of external source IP addresses comprises a range of IP addresses assigned to the endpoint group based on the grouping of endpoints;

replacing, by the first node, the IP address for the first host in the first packet with the external source IP address; and sending, by the first node, the first packet to the second node.

2. The method of claim 1, further comprising:

receiving, by the first node, a second packet from the second node, wherein the second packet includes the external source IP address;

based at least in part on the external source IP address, determining, by the first node from the table, the IP address for the first host;

replacing, by the first node, the external source IP address in the first packet with the IP address for the first host; and sending, by the first node, the second packet to the first host.

3. The method of claim 1, wherein the endpoint group is based at least in part on a security group tag.

4. The method of claim 1, wherein the endpoint group is based at least in part on one or more of a security group tag, user credentials, a device type, a flow identification (ID), or other non-security related attributes.

5. The method of claim 1, further comprising:

registering, by the first node, the first host with a control plane of the first network;

based at least in part on the endpoint group of the first host, assigning, by the control plane, the external source IP address to the first host;

forwarding the external source IP address to the first node; and storing, by the first node, the external source IP address with the IP address for the first host.

6. The method of claim 1, wherein the plurality of external source IP addresses comprises a sequential range of source IP addresses.

7. The method of claim 6, wherein the external source IP address is selected based at least in part on a next available external source IP address within the sequential range of external source IP addresses.

8. The method of claim 6, wherein the external source IP address is selected randomly from available external source IP addresses within the sequential range of external source IP addresses.

9. A system comprising:

one or more processors; and one or more non-transitory computer-readable media storing computer-executable instructions that, when executed by the one or more processors, cause the one or more processors to perform actions comprising:

receiving, at a first node of a first network, a first packet from a first host within the first network destined for a second host within a second network, wherein the first host is part of an endpoint group, and wherein the first packet includes an Internet protocol (IP) address for the first host;

determining, by the first node, destination routing information for the first packet to a second node within the second network;

based at least in part on the endpoint group, determining, by the first node from a table, an external source IP address associated with the endpoint group, wherein the external source IP address is one of a plurality of external source IP addresses assigned to the endpoint group for replacing IP addresses of hosts within the endpoint group, and wherein the plurality of external source IP addresses comprises a range of IP addresses assigned to the endpoint group based on the grouping of endpoints;

replacing, by the first node, the IP address for the first host in the first packet with the external source IP address; and sending, by the first node, the first packet to the second node.

10. The system of claim 9, wherein the actions further comprise:

receiving, by the first node, a second packet from the second node, wherein the second packet includes the external source IP address;

based at least in part on the external source IP address, determining, by the first node from the table, the IP address for the first host;

replacing, by the first node, the external source IP address in the first packet with the IP address for the first host; and sending, by the first node, the second packet to the first host.

11. The system of claim 9, wherein the endpoint group is based at least in part on a security group tag.

12. The system of claim 9, wherein the endpoint group is based at least in part on one or more of a security group tag, user credentials, a device type, a flow identification (ID), or other non-security related attributes.

13. The system of claim 9, wherein the actions further comprise:

registering, by the first node, the first host with a control plane of the first network;

based at least in part on the endpoint group of the first host, assigning, by the control plane, the external source IP address to the first host;

forwarding the external source IP address to the first node; and storing, by the first node, the external source IP address with the IP address for the first host.

14. The system of claim 9, wherein the plurality of external source IP addresses comprises a sequential range of external source IP addresses.

15. The system of claim 14, wherein the external source IP address is selected based at least in part on a next available external source IP address within the sequential range of external source IP addresses.

16. The system of claim 14, wherein the external source IP address is selected randomly from available external source IP addresses within the sequential range of external source IP addresses.

17. A method comprising:

receiving, at an edge of an access network, a first packet from a first host within the access network destined for a second host within a second network, wherein the first host is part of an endpoint group based at least in part on a security group tag (SGT), and wherein the first packet includes an Internet protocol (IP) address for the first host;

determining, by the edge, destination routing information for the first packet to a node associated with a network;

based at least in part on the SGT, determining, by the edge from a table, an external source IP address associated with the endpoint group, wherein the external source IP address is one of a plurality of external source IP addresses assigned to the endpoint group for replacing IP addresses of hosts within the endpoint group, and wherein the plurality of external source IP addresses comprises a range of IP addresses assigned to the endpoint group based on the grouping of endpoints;

replacing, by the edge, the IP address for the first host in the first packet with the external source IP address;

sending, by the edge, the first packet to the node;

receiving, by the edge, a second packet from the node, wherein the second packet includes the external source IP address;

based at least in part on the external source IP address, determining, by the edge from the table, the IP address for the first host;

replacing, by the edge, the external source IP address in the first packet with the IP address for the first host; and sending, by the edge, the second packet to the first host.

18. The method of claim 17, further comprising:

registering, by the edge, the first host with a control plane of the access network;

based at least in part on the endpoint group of the first host, assigning, by the control plane, the external source IP address to the first host;

forwarding the source IP address to the edge; and storing, by the edge, the external source IP address with the IP address for the first host.

19. The method of claim 18, wherein:

the plurality of external source IP addresses comprises a sequential range of source IP addresses; and the external source IP address is selected based at least in part on a next available external source IP address within the sequential range of external source IP addresses.

20. The method of claim 18, wherein:

the plurality of external source IP addresses comprises a sequential range of source IP addresses; and the external source IP address is selected randomly from available external source IP addresses within the sequential range of external source IP addresses.

* * * * *